Oct. 11, 1955
E. S. COOK
2,720,427
EMPTY AND LOAD BRAKE APPARATUS
Filed Oct. 31, 1951
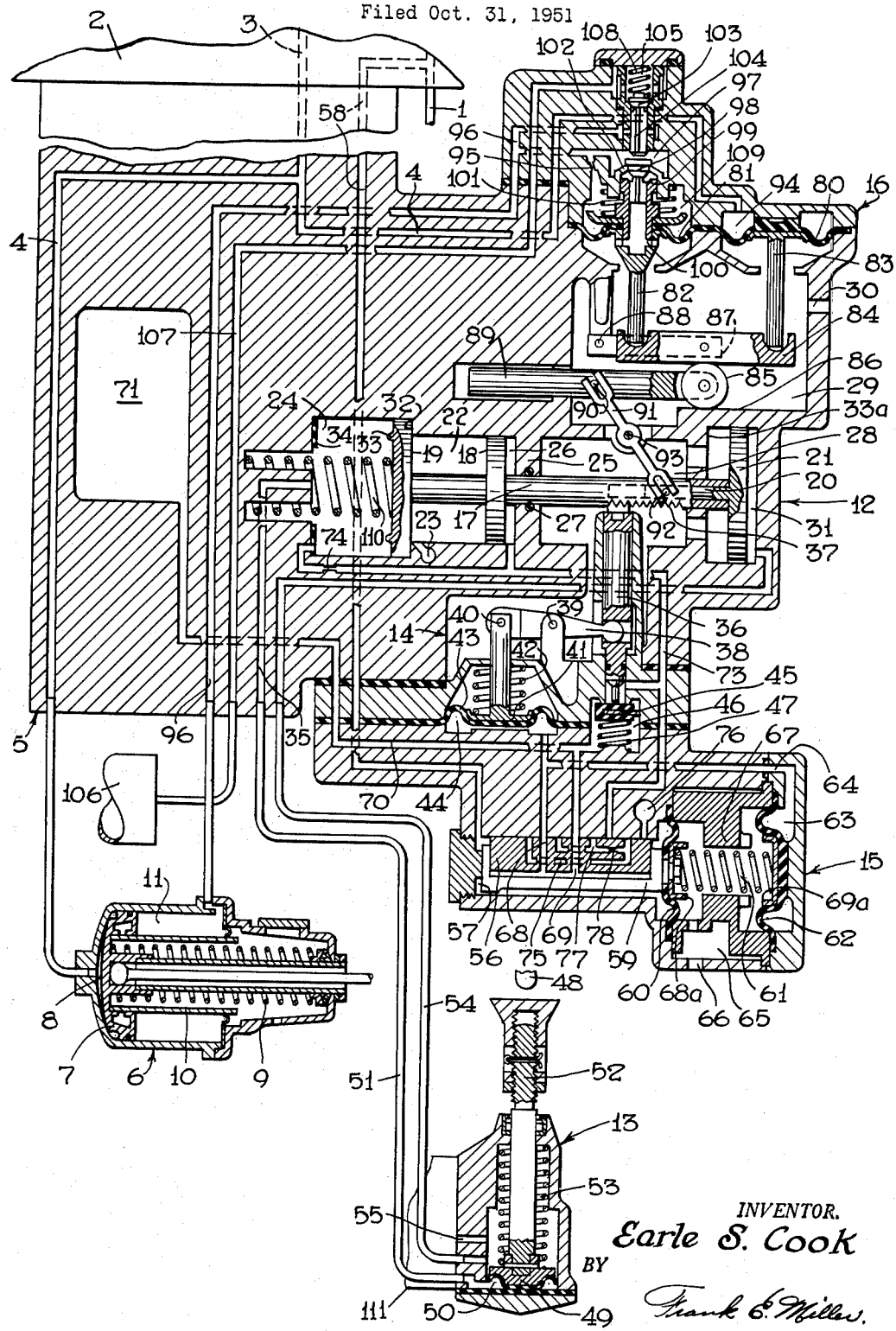
INVENTOR.
*Earle S. Cook*
BY
*Frank E. Miller.*
ATTORNEY

United States Patent Office 2,720,427
Patented Oct. 11, 1955

2,720,427

EMPTY AND LOAD BRAKE APPARATUS

Earle S. Cook, Forest Hills, Pa., assignor to Westinghouse Air Brake Company, Wilmerding, Pa., a corporation of Pennsylvania Application October 31, 1951, Serial No. 254,031

11 Claims. (Cl. 303—22)

This invention relates to fluid pressure brake apparatus for railway vehicles and more particularly to the type for braking a vehicle in accordance with the degree of load carried by the vehicle.

In my copending application, Serial No. 238,918, filed July 27, 1951, there is disclosed a brake apparatus having service and emergency portions operative upon service and emergency reductions in brake pipe pressures to supply fluid under pressure to effect service and emergency applications of brakes, respectively, on a railway vehicle. The brake apparatus also includes a load compensating valve portion which is automatically adjustable in accordance with the load on the vehicle to correspondingly limit the degree of the brake application effected by such fluid under pressure.

The load compensating valve portion disclosed in the above referred to application provides for a relatively large number of adjustments corresponding to a relative large number of different degrees of load. It is believed, however, that three adjustments, corresponding to an empty vehicle, a fully loaded vehicle and a partially loaded vehicle, such as one half load, are adequate for freight service and the principal object of the invention is therefore the provision of a relatively simple and inexpensive three adjustment device for use in a brake apparatus such as above described.

Other objects and advantages will become apparent from the following more detailed description of the invention.

In the accompanying drawing, the single figure is a diagrammatic view of a portion of a fluid pressure brake apparatus embodying the invention.

Description

As shown in the drawing, reference numeral 1 designates a usual brake pipe which is connected to a part 2 of a brake controlling valve device which may contain service and emergency application valve devices, like those disclosed in the above mentioned pending application, adapted to operate, in the usual manner, upon service and emergency reductions in pressure in said brake pipe to supply fluid under pressure to a passage 3. Fluid under pressure thus supplied to passage 3 is adapted to flow through a passage 4 in a device 5, embodying the invention, to a brake cylinder device 6 for actuating same to effect either service or emergency application of brakes, according to the reduction in brake pipe pressure.

The brake cylinder device 6 may comprise a casing containing a piston 7 at one side of which is the usual pressure chamber 8 in which fluid under pressure from passage 4 is adapted to become effective on said piston to move same in the direction of the right hand for applying brakes. Upon release of fluid under pressure from chamber 8 via passages 4 and 3 a return spring 9 is adapted to move piston 7 in the direction of the left-hand back to a brake release position in which it is shown in the drawing. A cylinder 10 encircling the release spring 9 and attached at one end to piston 7 and slidably mounted adjacent its opposite end in the casing cooperates with said piston and casing to provide a load compensating chamber 11 around said cylinder for receiving fluid under pressure to oppose pressure of fluid in chamber 8 acting on piston 7. With a vehicle fully loaded the chamber 11 will be vented, as will be later described, in order that the brakes on the vehicle will be applied to a degree governed by the full pressure of fluid in chamber 8 acting on piston 7. With a vehicle empty a certain maximum pressure of fluid will be provided in chamber 11 whereby the degree of braking of the empty vehicle will be limited to the differential in opposing forces thus provided on piston 7. For a half loaded vehicle, for example, a certain lower pressure of fluid will be provided in chamber 11 in order to obtain a greater differential in opposing forces on piston 7 as necessary to provide the greater braking force for the half loaded vehicle than for the empty vehicle.

The device 5 comprises a casing containing a load adjustable control device 12, a strut device 13 for controlling adjustment of said control device 12, a locking device 14 for locking said control device 12 in an adjusted position, a cutoff valve device 15 for controlling operation of said devices 12, 13 and 14 and a fluid pressure control device 16 for regulating pressure of fluid in the brake cylinder compensating chamber 11 according to the adjustment of the control device 12 and hence according to the load on the vehicle.

The load adjustable control device 12 comprises a brake control rod 17 connected at one end to two spaced apart movable abutments in the form of pistons 18, 19 and having a telescopic connection at its opposite end with a guide rod 20 projecting from one side of a movable abutment in the form of a piston 21. The piston 19 if of greater area than piston 18. Piston 21 may be of greater area than 19, but if preferred the combined areas of pistons 18 and 21 need noly exceed that of piston 19.

A chamber 22 formed in the casing between the pistons 18, 19 is in constant communication with atmosphere via vent 23. At the opposite side of piston 19 is a pressure chamber 24 while formed between the opposite side of piston 18 and a wall 25 in the casing is a pressure chamber 26. The rod 17 connected to piston 18 extends through a bore in wall 25 in sliding contact with a sealing ring 27 into a chamber 28 formed between said wall and the adjacent face of piston 21. Chamber 28 is open to atmosphere via chamber 29 and a vent 30. At the opposite side of piston 21 is a pressure chamber 31. In chamber 24 there is a bias spring 110 acting on piston 19 urging the several pistons and rod 17 to the position in which they are shown in the drawing.

When fluid under pressure is present in chambers 26, 24 with chamber 31 vented, the pressure of fluid in chamber 24 acting on piston 19 will overcome the opposing pressure of fluid in chamber 26 acting on the smaller piston 18 and move said pistons and the rod 17 to an empty position in which these parts are shown in the drawing and which may be defined by contact between piston 19 and a shoulder 32 in the casing. These parts will thus assume the empty position when a vehicle is empty, as will hereinafter be described in greater detail.

Also as will be later described, when the vehicle is partly loaded fluid under pressure will also be present in pressure chamber 31 acting on piston 21 which, by itself or together with pressure of fluid acting in chamber 26 on piston 18, will overcome pressure of fluid in chamber 24 plus spring 110 acting on piston 19 and move all of said pistons and the rod 17 to an intermediate or half load position which may be defined by engagement of piston 21 with a shoulder 33a in the casing. When the vehicle is fully loaded, chamber 24 as well as chamber 31, will be vented and fluid under pressure will be present in chamber 26 and acting on piston 18 will move the several pistons and rod 17 against spring 110 to a full load position which may be defined by a sealing rib 33 on piston 19 contacting a gasket 34 around a fluid pressure supply and release passage 35.

The locking device 14 comprises a plunger 36 slidably mounted in a bore in the casing and having on one end teeth for locking engagement with teeth 37 provided along one side of rod 17 to hold said rod in an adjusted position. A lever 38 having one end connected to plunger 36 and fulcrumed intermediate its ends on a pin 39 carried by the casing is connected at its opposite end by a pin 40 to a follower 41. A spring 42 acts on one side of follower 41 for actuating lever 38 to move plunger 36 into locking engagement with rod 17 while the opposite side of said follower is engaged by one side of a flexible diaphragm 43. At the opposite side of diaphragm 43 is a chamber 44. When fluid under pressure is supplied to chamber 44, as will be later described, the diaphragm 43 will be deflected thereby against spring 42 to operate lever 38 to move plunger 36 out of locking engagement with rod 17. Upon release of fluid under pressure from chamber 44 spring 42 will move plunger 36 into locking engagement with rod 17. A check valve 45 contained in a chamber 46 and normally seated by a spring 47 is arranged to be unseated by plunger 36 following disengagement thereof from rod 17.

The strut device 13 is adapted to be carried by a sprung portion 111 of a vehicle underneath an unsprung portion 48 whereby it will be spaced away from said unsprung portion a distance which varies according to the degree of load on the vehicle.

The strut device comprises a casing containing a vertically movable piston 49 at the lower side of which is a pressure chamber 50 open via pipe 51 to passage 35 in the load adjustable control device 12. Projecting upwardly from the upper side of piston 49 is a rod 52 terminating outside of the casing below the unsprung portion 48 of the vehicle. A spring 53 contained in the casing of the device acts on piston 49 for urging it to the position in which it is shown in the drawing.

When the vehicle is empty the strut device 13 will occupy a position relative to the unsprung portion 48 such as it is shown in the drawing and in which upward movement of piston 49 will be so limited by engagement with the unsprung portion 48 as not to open chamber 50 to a pipe 54 which is connected to piston chamber 31 in the control device 12. When the vehicle is substantially half loaded the strut device will occupy a lower position relative to the unsprung portion 48 to permit sufficient movement of piston 49 to open pipe 54 to chamber 50. When the vehicle is fully loaded, such movement of piston 49 against spring 53 will be permitted as to open chamber 50 and pipes 51 and 54 to an atmospheric vent port 55 provided in the casing of the device.

The cut-off valve device 15 comprises a slide valve 56 contained in a chamber 57 which is in constant communication with brake pipe 1 via passage 58. The slide valve 56 is connected by a stem 59 to a flexible diaphragm 60 for movement therewith. The diaphragm 60 is subject on one face to pressure of fluid in chamber 57 and on the opposite face to pressure of a spring 61 one end of which engages said diaphragm while the opposite end engages one side of a coaxially arranged flexible diaphragm 62 at the opposite side of which is a pressure chamber 63 open via passage 64 to the seat of slide valve 56 and to diaphragm chamber 44 in the locking device 14. Between the two diaphragms 60, 62 is a chamber 65 which is open to atmosphere via vent 66. Extending into chamber 65 is a casing stop 67 arranged for contact by followers 68a, 69a associated with diaphragms 60, 62, respectively, for limiting deflection thereof in the direction of said stop.

Whenever the pressure of fluid in the brake pipe 1 is less than a chosen degree, such as ten pounds, spring 61 will deflect diaphragm 60 against such pressure in chamber 57 and thereby move slide valve 56 to a cut in position in which it is shown in the drawing and which position may be defined by engagement of the left hand end of stem 59 with the casing. In this position of slide valve 56, passage 64 and diaphragm chamber 63 will be open to brake pipe 1 via port 68 in said slide valve, and spring 61 will be holding the diaphragm 62 in the position in which it is shown in the drawing.

In initially charging brake pipe 1, or upon charging said brake pipe following venting thereof to any pressure less than for example ten pounds, fluid under pressure will flow from said brake pipe to valve chamber 57 of the cut-off valve device 15 and thence through a port 69 in slide valve 56 to a passage 70 leading to the check valve chamber 46 and to a volume reservoir 71 for charging said chamber and reservoir with fluid at the pressure in the brake pipe. At the same time, fluid under pressure will also flow through port 68 to passage 64 and thence to diaphragm chambers 44 and 63. When a sufficient pressure of fluid is thus obtained in chamber 44 to overcome the opposing pressure of spring 42 on diaphragm 43, said diaphragm will deflect against said spring and move plunger 36 out of locking engagement with rod 17 followed by unseating of check valve 45 by said plunger. Upon release of plunger 36 from rod 17, said rod and the pistons 19, 18 and 21 will be promptly shifted by spring 110 to the right hand position in which they are shown in the drawing, unless already so positioned.

Upon unseating of check valve 45, the fluid under pressure present in the volume reservoir 71 will flow past said check valve to a passage 73 and thence into piston chamber 26 where it will act on piston 18 of the control device 12 and tend to move the pistons 18, 19, 21 and rod 17 toward the left hand against spring 110. At the same time, however, fluid under pressure supplied to passage 73 will also flow through a choke 74 into piston chamber 24 where it will act with spring 110 on piston 19 to hold said piston against moving the rig 33 into sealing engagement with gasket 34. Fluid under pressure supplied through choke 74 to chamber 24 will then flow to passage 35 and thence through pipe 51 to chamber 50 in the strut device 13. The pressure of fluid thus obtained in chamber 50 will move piston 49 upward until stopped by engagement of the piston rod 52 with the unsprung portion 48 of the vehicle.

If the vehicle is empty the movement of piston 49 being so limited as not to open pipe 54 to chamber 50, said pipe and thereby piston chamber 31 will not be supplied with fluid under pressure and through choke 74 pressure of fluid in chambers 50 and 24 will equalize with that in chamber 26 of the control device 12. Piston 19 being of greater area than piston 18, the pressure of fluid in chamber 24 plus spring 110 acting on piston 19 will then move said pistons and rod 17 to the position in which they are shown in the drawing as desired for the empty vehicle. This positioning of rod 17 will be obtained whenever the vehicle is empty or loaded to a degree less than will permit piston 49 to be moved by pressure of fluid in chamber 50 past the connection with pipe 54.

If the vehicle is carrying, for example, a half load, the strut device 13 will be so disposed relative to the unsprung portion 48 of the vehicle, that the fluid under pressure provided in chamber 50, as above described, will move the piston 49 past the opening to pipe 54 before the piston rod 52 contacts the unsprung portion 48 of the vehicle. Fluid under pressure will then flow from chamber 50 to pipe 54 and thence to piston chamber 31 in the control device 12. When the pressure of fluid in chamber 31 then increases sufficiently to provide a force on piston 21 which, by itself or together with that provided by pressure of fluid in chamber 26 on piston 18, exceeds the opposing force created by pressure of fluid in chamber 24 plus spring 110 on piston 19, will move piston 21, rod 17 and pistons 18 and 19 to their half load position defined by engagement of piston 21 with the shoulder 33a in the casing.

If the vehicle is fully loaded, then the strut device 13 will be so disposed with respect to the unsprung portion 48 of the vehicle, that when fluid under pressure is supplied to chamber 50 the piston 49 will be moved to a position to open said chamber to the vent 55 whereupon, due to the restricting action of choke 74, the pressure of fluid in chamber 50, pipe 51, passage 35 and piston chamber 24, will suddenly reduce to a degree which will permit the pressure of fluid now present in chamber 26 and acting on piston 19 to move said piston to its extreme left hand position in which the sealing rib 33 will seal against the gasket 34. The area of piston 19 within the rib 33 will thus become subjected to atmospheric pressure while that around said rib will become subject to the same pressure of fluid as acting in chamber 26, but the area around said rib being less than the area of piston 18 subject to pressure of fluid in chamber 26, the piston 18 will hold the several pistons and rod 17 in this extreme left hand position against spring 110, which position corresponds to the fully loaded vehicle. The engagement of rib 33 with gasket 34 also cuts off further supply of fluid under pressure to pipe 51 and the strut piston chamber 50, so that once the strut piston rod 52 has engaged the unsprung portion 48 of the vehicle to effect venting of the fluid under pressure from chambers 50 and 24 followed by the rib 33 engaging gasket 34 to cut off further supply of fluid under pressure to said chambers, spring 53 will return said piston toward its normal position, in which it is shown in the drawing, as leakage dissipates whatever fluid under pressure may remain in chamber 50 and pipe 51.

While the rod 17 is being adjusted, as above described, the pressure of fluid in brake pipe 1 and in valve chamber 57 and diaphragm chamber 63 of the cut off valve device will continue to increase. This increase in pressure in chamber 63 on diagram 62 will gradually deflect said diaphragm against spring 61 for increasing the pressure of said spring against diaphragm 69 in order that said diaphragm 69 and the slide valve 56 will not be moved by increasing pressure of fluid in the brake pipe and valve chamber 57 until after rod 17 has been properly adjusted as above described. Finally, at a chosen pressure in the brake pipe 1 and diaphragm chamber 63, such as thirty five pounds, the deflection of diaphragm 62 will be stopped by engagement of follower 69a with the casing stop 67. As the pressure in the brake pipe 1 and valve chamber 57 then continues to increase, such pressure will deflect diaphragm 69 against spring 61 and finally move the slide valve 56 to a cut off position defined by contact between the diaphragm follower 68a and the casing stop 67.

In this cut off position of slide valve 56, ports 68, 69 will be moved out of registry with passages 64 and 70 in order to cut off the supply of fluid under pressure thereto from the brake pipe 1 and a port 75 in the slide valve 56 will connect passage 64 to an atmospheric passage 76, while a port 77 in said valve will connect passages 70 and 73 through a choke 78 to passage 75 and thence to atmosphere via passage 76.

Such venting of fluid under pressure from passage 64 will result in venting of diaphragm chamber 44 in the latch device 14 and diaphragm chamber 63 in the cut off valve device. The venting of chamber 44 will permit spring 42 to move the plunger 36 into locking engagement with rod 17 to hold it in its load adjusted position while the venting of chamber 63 will permit spring 61 to move the diaphragm 62 to the position in which it is shown in the drawing for reducing the pressure of said spring on diaphragm 60 to such a degree that diaphragm 60 and slide valve 56 will remain in their cut off position until brake pipe pressure in chamber 57 is reduced subsequently to a relatively low pressure such as ten pounds. The venting of passages 70 and 64 merely dissipates fluid under pressure remaining in the volume reservoir 71, check valve chamber 46 and piston chambers 26 and 24 of the control device 12, it being noted however that choke 78 restricts such venting with respect to release of fluid under pressure from diaphragm chamber 44 to ensure operation of plunger 36 into locking engagement with rod 17 while the pistons of the control device 12 are yet positively held in their load adjusted position by pressure of fluid.

It will now be seen that in charging the brake pipe 1 with fluid under pressure, the rod 17 will be adjusted to either one of three different positions according to whether the vehicle is empty, fully loaded, or partially loaded and will then be locked by plunger 36 in said position until the brake pipe is subsequently recharged following depletion thereof to below the relatively low pressure of ten pounds.

As before mentioned, the numeral 16 designates a fluid pressure control device and said device is adapted to operate upon supply of fluid under pressure to the brake cylinder pressure chamber 8 to control pressure of fluid in the brake cylinder compensating chamber 11 for thereby varying the degree of braking of the vehicle in accordance with the adjustment of rod 17.

By way of example, the fluid pressure control device 16 may comprise two spaced apart flexible diaphragms 80, 81 open at one side to the vented chamber 29 and connected by parallel arranged struts 82, 83 to opposite ends of a scale beam 84. The beam 84 is mounted between its ends to rock on an adjustable fulcrum in the form of a roller 85 supported on a flat surface 86 in the casing in the device. The beam 84 is held in alignment with the struts 82, 83 by a pivotal connection with a link 87 in turn pivotally connected by a pin 88 to the casing of the device.

The roller 85 is pivotally connected to one end of a rod 89 which may be connected by a pin 90 to one end of a lever 91 the opposite end of which is pivotally connected by a pin 92 to the rod 17. Intermediate its ends the lever 91 is fulcrumed on a pin 93 carried by the casing of the device.

By the arrangement just described it will be seen that the rod 89 and fulcrum roller 85 will be moved by and with and occupy positions corresponding to those of rod 17. When the rod 17 is in its empty car position, as shown in the drawing, the roller 85 will engage scale beam 84 substantially midway between its connections with struts 82, 83. When rod 17 is in the position for a fully loaded vehicle, the roller 85 will be disposed substantially under the end of strut 83, and when in the position for a half loaded vehicle said roller will engage the beam 84 at a point intermediate those engaged in the empty and full load positions, respectively, of rod 17.

At the side of diaphragm 80 opposite chamber 29 is a chamber 94 which is in constant communication with the brake cylinder passage 4, while at the corresponding side of diaphragm 81 is a chamber 109 open through a stabilizing choke 95 to a passage 96 in constant communication with the compensating chamber 11 in the brake cylinder device. Passage 96 also leads to a chamber 97 containing a release valve 98 arranged to cooperate with a seat 99 on the diaphragm strut 82 to control communication between the brake cylinder compensating chamber 11 and atmosphere via chamber 97, a passageway 100 in said strut and the vented chamber 29. With the diaphragm strut 82 in its normal position, in which it is shown in the drawing and to which it is urged by a spring 101, the release valve 98 is supported out of contact with its seat by a casing rib 102. Above the release valve 98 there is a coaxially arranged supply valve 103 having a stem 104 depending through a bore in the casing into chamber 97 for engagement by the release valve 98, passage 96 being constantly open to said bore. The supply valve is contained in a chamber 105 adapted to be constantly supplied with fluid under pressure from a fluid pressure supply reservoir 106 via passage 107. A spring 108 in chamber 105 acts on the supply valve 103 urging it to its seat.

In operation, when fluid under pressure is supplied to the brake cylinder passage 4 and thereby to the brake cylinder pressure chamber 8 to effect an application of brakes on the vehicle, such fluid pressure will become effective in chamber 94 on diaphragm 80.

Now assuming that the fulcrum roller 85 is in the position for an empty vehicle, in which it is shown in the drawing engaging the beam 84 midway between struts 82, 83, the pressure of fluid in chamber 94 will deflect the diaphragm 80 downward and through the medium of strut 83, beam 84 and strut 82 deflect the diaphragm 81 upward to first seat the release valve 98 and through said valve and the supply valve stem 104 unseat the supply valve 103. Fluid under pressure will then flow from the supply reservoir 106 past the supply valve 103 to passage 96 and thence to the brake cylinder compensating chamber 11 and also through choke 95 to chamber 109. When the pressure of fluid thus obtained in chamber 109 and acting on diaphragm 81 becomes sufficient to overcome the opposing force developed by pressure of fluid in chamber 94 on diaphragm 80, the bias spring 101 will deflect the diaphragm 81 downward against said opposing force to permit closing of valve 103 to thereby limit the pressure of fluid obtained in the brake cylinder compensating chamber 11 in accordance with the pressure of fluid acting in chamber 94 on diaphragm 80 and the position of the fulcrum 85 with respect to the beam 84. With the roller engaging the beam 84 midway between the struts 82, 83 for an empty vehicle, it will thus be apparent that the supply valve 103 will close when the pressure of fluid obtained in the brake cylinder compensating chamber 11 and diaphragm chamber 109 equals substantially that acting in the brake cylinder pressure chamber 8 and diaphragm chamber 94, and the degree of braking of the empty vehicle will be limited by the differential in forces developed by the substantially equal pressures of fluid in the brake cylinder chambers 8 and 11 acting on the different areas of the brake cylinder piston 7.

If the fulcrum roller 85 is in contact with beam 84 at a point between its empty position and the strut 83, as it will be for a partly loaded vehicle, it will be seen that the supply valve 103 will close to limit the pressure of fluid obtained in the compensating chamber 11 according to the ratio of the lever arms of beam 84 and therefore to a degree less than for an empty vehicle, whereby the braking force developed by the brake cylinder piston 7 will be correspondingly greater, as necessary for the partially loaded vehicle.

If the roller 85 is directly under the strut 83, as it will be for a fully loaded vehicle, it will be seen that pressure of fluid provided in chamber 94 to act on diaphragm 80 will not operate the beam 84, as a result of which the release valve 98 will remain open to maintain the brake cylinder compensating chamber 11 in communication with atmosphere. Under this fully loaded vehicle condition, the brakes on the vehicle will therefore be applied with a force equal to the pressure of fluid in the brake cylinder chamber 8 acting on the full exposed area of piston 7.

When it is desired to release the brakes on the vehicle fluid under pressure will be released from the brake cylinder passage 4, pressure chamber 8 and diaphragm chamber 94. Upon release of fluid under pressure from chamber 8 the spring 9 will return the brake cylinder piston to its brake release position in which it is shown in the drawing. If fluid under pressure is present in the brake cylinder compensating chamber 11 and thereby diaphragm chamber 109 at this time, the diaphragm 81 will be deflected downward by such pressure upon release of fluid under pressure from chamber 94 for unseating the release valve 98, whereupon fluid under pressure will be released from the brake cylinder compensating chamber past said valve to atmosphere.

*Summary*

It will now be seen that I have provided an improved brake apparatus adjustable upon charging the usual brake pipe with fluid under pressure to provide, upon subsequently effecting an application of brakes, either of three different degrees of braking of a vehicle corresponding to an empty vehicle, a fully loaded vehicle and a partially loaded vehicle.

Having now described my invention, what I claim as new and desire to secure by Letters Patent, is:

1. In a vehicle brake apparatus, in combination, a brake control element adjustable to three different spaced apart positions corresponding to three different degrees of vehicle braking, motor means comprising a casing, three movable abutments in said casing each operable by fluid under pressure to move said element, and three stop shoulders in said casing, one for each of said abutments, spaced according to spacing of said positions and adapted to be engaged by the respective abutments to limit movement thereof by fluid under pressure and thereby define the respective positions of said element a brake pipe, means operable upon charging said brake pipe with fluid under pressure to supply fluid under pressure to operate said abutments, and means automatically operable according to the empty or loaded condition of the vehicle to select the one of said abutments operable by said fluid under pressure to position said control element.

2. In a vehicle brake apparatus, in combination, a brake control element adjustable to three different spaced apart positions corresponding to three different degrees of vehicle braking, motor means comprising a casing, three movable abutments in said casing each operable by fluid under pressure to move said element, and three stop shoulders in said casing, one for each of said abutments, spaced according to spacing of said positions and adapted to be engaged by the respective abutments to limit movement thereof by fluid under pressure and thereby define the respective positions of said element a brake pipe, means operable upon charging said brake pipe with fluid under pressure to supply fluid under pressure, a load carrying sprung vehicle part, an unsprung vehicle part, and means carried by one of said parts operable by the fluid under pressure supplied by said means to cooperate with the other part to select the one of said abutments operable by fluid under pressure to position said control element.

3. In a vehicle brake apparatus, in combination, a brake control element adjustable to three different spaced apart positions corresponding to three different degrees of vehicle braking, a first movable abutment operable by fluid under pressure to move said element, a second movable abutment operable by fluid under pressure to move said element, a third movable abutment operable by fluid under pressure for moving said element, means for limiting movement of said first, second and third movable abutments, by fluid under pressure to position said element in a first, second, or third position respectively, of said three positions, a brake pipe, means operative upon charging of said brake pipe with fluid under pressure to supply fluid under pressure to operate said abutments, a load carrying sprung vehicle part, an unsprung vehicle part, and means carried by one of said parts operative by fluid under pressure supplied by said means into cooperative relation with the other part for selecting the one of said abutments operable by fluid under pressure supplied by said means to position said element.

4. In a vehicle brake apparatus, in combination, a brake control element adjustable to three different spaced apart positions corresponding to three different degrees of vehicle braking, latch means for locking said control element in an adjusted position, and releasable by fluid under pressure to permit adjustment of said element, three movable abutments each operable by fluid under pressure to move said control element and three stop shoulders in said casing, one for each of said abutments, spaced according to spacing of said positions and adapted to be engaged by the respective abutments to limit movement thereof by fluid under pressure and thereby define the respective positions of said element, a load carrying sprung vehicle part, an unsprung vehicle part, control means carried by one of said parts operable by fluid under pressure into cooperative relation with the other part to supply fluid under pressure to one or another of said abutments according to the degree of load on said sprung part, a brake pipe, and valve means controlled by pressure of fluid in said brake pipe operative with such pressure below a chosen degree to supply fluid under pressure to said latch means and control means for actuating same and operative by pressure in said brake pipe exceeding said chosen degree to vent the fluid under pressure from said latch means and control means.

5. In a vehicle brake apparatus, in combination, a brake control element adjustable to three different spaced apart positions corresponding to three different degrees of vehicle braking, latch means for locking said control element in an adjusted position, and releasable by fluid under pressure to permit adjustment of said element, three movable abutments each operable by fluid under pressure to move said control element and three stop shoulders in said casing, one for each of said abutments, spaced according to spacing of said positions and adapted to be engaged by the respective abutments to limit movement thereof by fluid under pressure and thereby define the respective positions of said element, a load carrying sprung vehicle part, an unsprung vehicle part, control means carried by one of said parts operable by fluid under pressure into cooperative relation with the other part to supply fluid under pressure to one or another of said abutments according to the degree of load on said sprung part, a brake pipe, valve means operative in response to pressure in said brake pipe below a chosen degree to supply fluid under pressure to said latch means and above said chosen degree to release fluid under pressure from said latch means and control means, and means operative by fluid pressure operation of said latch means to supply fluid under pressure to said control means.

6. In a vehicle brake apparatus, in combination, a brake control element having three different positions of adjustment to provide three different degrees of vehicle braking, a first movable abutment operable by fluid under pressure to move said control element to one of said positions, a second movable abutment operable by fluid under pressure to move said control element to a second one of said positions against pressure of fluid acting on said first abutment, and a third movable abutment operable by fluid under pressure to cooperate with pressure of fluid on said first movable aboutment to move said control element to its third position against pressure of fluid on said abutment, a brake pipe, valve means responsive to pressure of fluid in said brake pipe of less than a chosen degree to supply fluid under pressure from said brake pipe directly to said first abutment and also for supply to said second and third abutments and when in excess of a chosen high degree to release such fluid under pressure, a load carrying vehicle sprung part, a vehicle unsprung part, and means carried by one of said parts and operable by fluid under pressure supplied by said valve means to supply fluid under pressure to act on said second and third abutments according to the load on said vehicle.

7. In a vehicle brake apparatus, in combination, a brake control element having an empty position corresponding to an empty condition of said vehicle, a partial load position corresponding to a chosen degree of load on the vehicle and a full load position corresponding to a full degree of vehicle load, spring means acting on said element urging it towards said empty position, a passageway, a brake pipe, valve means operable in response to pressure in said brake pipe below a chosen degree to supply fluid under pressure from said brake pipe to said passageway and above said chosen degree to vent said passageway, three movable abutments one subject to pressure of fluid in a first chamber open to said passageway and adapted to be operated upon supply of fluid under pressure to said passageway and chamber to move said element to said full load position, a second of greater area than said one and adapted to be operated by pressure of fluid in a second chamber for moving said element to said empty position against pressure of fluid in said first chamber acting on said one abutment, and the third adapted to be operated by pressure of fluid in a third chamber to cooperate with pressure of fluid acting on said one abutment to move said element to said partial load position, means including a choke opening said passageway to said second chamber, a first pipe connected to said second chamber, a second pipe connected to said third chamber, a vehicle load carrying sprung part, a vehicle unsprung part, and a strut device comprising a casing carried by one of said parts and piston means in said casing operable upon supply of fluid under pressure to a fourth chamber open to said first pipe into contact with the other vehicle part for opening said first pipe to said second pipe in a partial loaded position of said sprung part relative to said unsprung part, for venting both of said pipes in a full loaded position of said sprung part relative to said unsprung part and for preventing flow of fluid under pressure from said first pipe and fourth chamber in an empty position of said sprung part relative to said unsprung part.

8. In a vehicle brake apparatus, in combination, a brake control element having an empty position corresponding to an empty condition of said vehicle, a partial load position corresponding to a chosen degree of load on the vehicle and a full load position corresponding to a full degree of vehicle load, spring means acting on said element urging it towards said empty position, a passageway, a brake pipe, valve means operable in response to pressure in said brake pipe below a chosen degree to supply fluid under pressure from said brake pipe to said passageway and above said chosen degree to vent said passageway, three movable abutments one subject to pressure of fluid in a first chamber open to said passageway and adapted to be operated upon supply of fluid under pressure to said passageway and chamber to move said element to said full load position, a second of greater area than said one and adapted to be operated by pressure of fluid in a second chamber for moving said element to said empty position against pressure of fluid in said first chamber acting on said one abutment, and the third adapted to be operated by pressure of fluid in a third chamber to cooperate with pressure of fluid acting on said one abutment to move said element to said partial load position, means including a choke opening said passageway to said second chamber, a first pipe connected to said second chamber, a second pipe connected to said third chamber, a vehicle load carrying sprung part, a vehicle unsprung part, a strut device comprising a casing carried by one of said parts and piston means in said casing operable upon supply of fluid under pressure to a fourth chamber open to said first pipe into contact with the other vehicle part for opening said first pipe to said second pipe in a partial loaded position of said sprung part relative to said unsprung part, for venting both of said pipes in a full loaded position of said sprung part relative to said unsprung part and for preventing flow of fluid under pressure from said first pipe and fourth chamber in an empty position of said sprung part relative to said unsprung part, and valve means operable by said second abutment in said full load position of said element to close communication between said second chamber and said first pipe.

9. In a vehicle brake apparatus, in combination, a brake control element adjustable to a plurality of different positions corresponding to different degrees of vehicle load, movable abutment means for positioning said element controlled by pressure of fluid in one chamber acting on said abutment means in opposition to pressure of fluid in another chamber and operative by pressure of fluid in said one chamber upon release of fluid under pressure from the other chamber to move said element to one of said positions, spring means acting on said abutment means urging same and said element to another of its positions, a restricted communication connecting said chambers to each other, a brake pipe, means operative upon charging said brake pipe with fluid under pressure to supply fluid under pressure to said one chamber and through said communication to said other chamber, and means adjustable according to the degree of load on the vehicle for either opening or closing a vent from said other chamber.

10. In a vehicle brake apparatus, in combination, a brake control element adjustable to a plurality of different positions corresponding to different degrees of vehicle load, movable abutment means for positioning said element and adapted to be operated to one position by pressure of fluid in one chamber upon release of fluid under pressure from another chamber, spring means acting on said abutment means urging same and said element to another of its positions, a restricted communication connecting said chambers, means for supplying fluid under pressure to said one chamber at one rate and through said communication to said other chamber at a slower rate, and means for either opening or closing a vent from said other chamber according to the degree of load on the vehicle.

11. In a vehicle brake apparatus, in combination, a brake control element adjustable to a plurality of different positions corresponding to different degrees of vehicle load, movable abutment means for positioning said element and adapted to be operated to one position by pressure of fluid in one chamber upon release of fluid under pressure from another chamber, spring means acting on said abutment means urging same and said element to another of its positions, a restricted communication connecting said chambers, means for supplying fluid under pressure to said one chamber at one rate and through said communication to said other chamber at a slower rate, a movable abutment operable upon supply of fluid under pressure to a third chamber to move said element to still a third position, and means operable according to the degree of load on the vehicle for either closing a vent from said other chamber, for opening said vent or for supplying fluid under pressure to said third chamber.

References Cited in the file of this patent

UNITED STATES PATENTS

| | | |
|---|---|---|
| 2,344,868 | Hewitt | Mar. 21, 1944 |
| 2,364,927 | Sudduth | Dec. 12, 1944 |
| 2,447,857 | Hewitt | Aug. 24, 1948 |
| 2,517,855 | Klein | Aug. 8, 1950 |